United States Patent [19]
Muramoto et al.

[11] Patent Number: 5,669,845
[45] Date of Patent: Sep. 23, 1997

[54] SHIFT CONTROL SYSTEM FOR TROIDAL CONTINUOUSLY VARIABLE TRANSMISSION

[75] Inventors: Itsuro Muramoto, Yokosuka; Hitoshi Kidokoro, Yokohama, both of Japan

[73] Assignee: Nissan Motor Co., Ltd., Yokohama, Japan

[21] Appl. No.: 624,660

[22] Filed: Mar. 28, 1996

[30] Foreign Application Priority Data

Mar. 29, 1995 [JP] Japan ................... 7-071495

[51] Int. Cl.$^6$ ............... F16H 15/04; F16H 59/38
[52] U.S. Cl. ................ 475/186; 475/192; 477/50
[58] Field of Search ................... 475/186, 192; 477/50

[56] References Cited

U.S. PATENT DOCUMENTS

| | | | |
|---|---|---|---|
| 2,958,234 | 11/1960 | Oehrli | 475/186 |
| 4,744,032 | 5/1988 | Miyaura et al. | 477/50 |
| 4,963,122 | 10/1990 | Ryan | 475/186 |
| 5,042,326 | 8/1991 | Hibi et al. | 477/50 |
| 5,083,473 | 1/1992 | Nakano | 74/190.5 |
| 5,099,719 | 3/1992 | Hibi et al. | 477/50 |
| 5,136,891 | 8/1992 | Nakano | 74/190.5 |
| 5,144,850 | 9/1992 | Hibi | 74/200 |
| 5,178,043 | 1/1993 | Nakamo | 475/192 |
| 5,187,995 | 2/1993 | Nakano | 476/10 |
| 5,238,460 | 8/1993 | Esaki et al. | 475/192 |
| 5,286,240 | 2/1994 | Kobayashi | 476/10 |

*Primary Examiner*—Dirk Wright
*Attorney, Agent, or Firm*—Foley & Lardner

[57] ABSTRACT

A shift control system for a troidal continuously variable transmission comprises an electronic system for calculating a shift command value, a first electronic feedback system for feeding back a first physical quantity indicative of the tilting angle of power rollers, and a second electronic feedback system for feeding back a second physical quantity indicative of a speed of change of the tilting angle of the power rollers, the electronic system calculating the shift command value in accordance with the first and second physical quantities.

16 Claims, 14 Drawing Sheets

SHIFT CONTROL SYSTEM FOR TROIDAL CONTINUOUSLY VARIABLE TRANSMISSION

BACKGROUND OF THE INVENTION

The present invention relates generally to a troidal continuously variable transmission and more particularly, to its shift control system.

A troidal continuously variable transmission is disclosed, for example, in U.S. Pat. No. 5,083,473 to Nakano. This troidal continuously variable transmission comprises a troidal transmission unit having input and output discs and power rollers frictionally engaged therewith for ensuring power transmission, and a shift control system.

The shift control system comprises a stepper motor which is rotated in response to a shift command value or feed forward step number corresponding to a target speed ratio, obtaining tilting of the power rollers. Thus, the diameter of a circle formed between two contact points of each power roller with respect to the input and output discs is continuously varied to ensure continuous shifting.

Specifically, when receiving the shift control command value, the stepper motor is driven to displace an outer valve element of a shift control valve from a neutral position relative to an inner valve element thereof. Thus, a hydraulic servo actuator comprising the shift control valve and a piston makes the power rollers be offset by y as will be described later in connection with the preferred embodiment, which produces tilting of the power rollers by $\phi$. With this tilting $\phi$, a transmission input revolution $N_i$ determined in connection with a transmission output revolution $N_o$ is varied to approach a target input revolution $N_i^*$.

A precess cam is arranged to feed back the power roller offset amount y and the power roller tilting angle $\phi$ to the inner valve element of the shift control valve, which is thus moved by X to follow the above displacement of the outer valve element, decreasing a relative displacement between the inner and outer valve elements of the shift control valve to dx. The relative displacement dx becomes smaller with a progress of shifting, and, finally, 0 when the above shift command value is achieved. At that time, the inner and outer valve elements of the shift control valve are relatively returned to the initial neutral position, enabling maintaining of the shift command value as achieved.

When a tilting angle feedback gain determined by the cam shape of the precess cam is a, and an offset amount feedback gain determined by the lever ratio of a shift link is b, the feedback amount X out of the precess cam is given by a formula of $X = a \cdot \phi + b \cdot y$. Since control aims to set the power roller tilting angle $\phi$ to a value corresponding to the target speed ratio, the precess cam needs only to feed back the power roller tilting angle $\phi$, in principle. The reason why not only the power roller tilting angle $\phi$, but the power roller offset amount y are fed back is to obtain a damping effect for preventing vibratile shift control, and thus avoid a hunting phenomenon of shift control.

As for the known shift control system for a troidal continuously variable transmission, however, an offset-direction relative displacement between the power roller and a member for rotatably supporting the power roller caused by deformation of the power roller support member as a primary factor and defective engagement thereof as a secondary factor produces a disturbance $\Delta y$ which is added to the precess cam, so that a wrong power roller offset amount is fed back to the shift control valve through the precess cam.

As a result, the feedback amount $X = a \cdot \phi + b(y + \Delta y)$ is actually obtained with respect to the theoretical feedback amount given by the formula of $X = a \cdot \phi + b \cdot y$, so that due to a divergent part $(b \cdot \Delta y)$ of the feedback amount, when the shift control valve is returned to the neutral position, i.e. upon completion of shifting, the power roller cannot have a tilting angle $\phi$ corresponding to a shift command value, producing so-called torque shift wherein the power roller tilting angle $\phi$ is deviated from that one corresponding to the target speed ratio, resulting in lowered shift accuracy.

One of solutions of the torque shift is as follows. In view of the fact that deformation of the power roller support member as a primary factor of torque shift is due to a pressing force for holding the power roller between the input and output discs, which is produced corresponding to transmission input torque, the relation between transmission input torque and the feedback divergent part $(b \cdot \Delta y)$ is determined in advance, based on which a shift command value or feed forward step number provided to the stepper motor is corrected to dissolve the torque shift.

However, actually, since the offset-direction relative displacement $\Delta y$ between the power roller and the precess cam is varied with elapse change of defective engagement thereof, conditions of an engine and torque converter, etc., the above solution cannot ensure a perfect restraint of occurrence of the torque shift over a long period of time.

Another solution of the torque shift is such that feedback control is carried out such as proportional-plus-integral (PI) control in accordance with a deviation of the power roller tilting angle $\phi$ from a target tilting angle $\phi^*$ to converge the power roller tilting angle $\phi$ to the target tilting angle $\phi^*$.

It is noted that since the offset-direction relative displacement $\Delta y$ between the power roller and the precess cam as a cause of the torque shift is considerably great, a proportional gain of the above feedback control should be considerably increased to achieve the above convergence at a practical response level.

Thus, with the above feedback control, the shift control system for a troidal continuously variable transmission, which is a system of higher order, i.e. second order or more, has a stability deteriorated. That is, during a period of transition wherein the power roller tilting angle $\phi$ or speed ratio is changed, the tilting angle $\phi$ produces a hunting with respect to the target tilting angle $\phi^*$.

The problem of hunting is dissolved by enlarging, through a change of the shift link, the coefficient b of the term $(b \cdot y)$ in the above formula, which serves to give effective damping to hunting. However, since the offset-direction relative displacement $\Delta y$ between the power roller and the precess cam as a cause of the torque shift has a feedback amount determined also in accordance with the coefficient b, the above solution results in lowering of the shift control accuracy due to increased torque shift.

It is, therefore, an object of the present invention to provide a shift control system for a troidal continuously variable transmission which can realize stable shift control.

SUMMARY OF THE INVENTION

According to one aspect of the present invention, there is provided a shift control system for a troidal continuously variable transmission provided with input and output discs and power rollers frictionally engaged with the input and output discs for ensuring power transmission therebetween, the shift control system serving to make, in accordance with a shift command value, the power rollers be offset with respect to a position wherein a rotation axis thereof and a rotation axis of the input and output discs cross each other so as to produce tilting of the power rollers about an oscillating axis perpendicular to the rotation axis thereof, the shift control system serving to return the power rollers to the position so as to maintain the shift command value as achieved, the shift control system comprising:

an electronic system arranged to calculate the shift command value;

a first electronic feedback system connected to said electronic system, said first electronic feedback system serving to feed back a first physical quantity indicative of a tilting angle of the power rollers; and a second electronic feedback system connected to said electronic system, said second electronic feedback system serving to feed back a second physical quantity indicative of a speed of change of said tilting angle of the power rollers, said electronic system calculating the shift command value in accordance with said first and second physical quantities.

Another aspect of the present invention lies in providing a shift control system for a troidal continuously variable transmission provided with input and output discs and power rollers frictionally engaged with the input and output discs for ensuring power transmission therebetween, the shift control system serving to make, in accordance with a shift command value, the power rollers be offset with respect to a position wherein a rotation axis thereof and a rotation axis of the input and output discs cross each other so as to produce tilting of the power rollers about an oscillating axis perpendicular to the rotation axis thereof, the shift control system serving to return the power rollers to the position so as to maintain the shift command value as achieved, the shift control system comprising:

means for calculating the shift command value;

means, connected to said calculating means, for electronically feeding back a first physical quantity indicative of a tilting angle of the power rollers; and means, connected to said calculating means, for electronically feeding back a second physical quantity indicative of a speed of change of said tilting angle of the power rollers, said calculating means calculating the shift command value in accordance with said first and second physical quantities.

The other aspect of the present invention lies in providing, in a troidal continuously variable transmission: input and output discs;

power rollers frictionally engaged with said input and output discs for ensuring power transmission therebetween; and a shift control system arranged to operate on said power rollers for ensuring shifting, said shift control system serving to make, in accordance with a shift command value, said power rollers be offset with respect to a position wherein a rotation axis thereof and a rotation axis of said input and output discs cross each other so as to produce tilting of said power rollers about an oscillating axis perpendicular to said rotation axis thereof, said shift control system serving to return said power rollers to said position so as to maintain said shift command value as achieved, said shift control system comprising:

an electronic system arranged to calculate said shift command value;

a first electronic feedback system connected to said electronic system, said first electronic feedback system serving to feed back a first physical quantity indicative of a tilting angle of said power rollers; and a second electronic feedback system connected to said electronic system, said second electronic feedback system serving to feed back a second physical quantity indicative of a speed of change of said tilting angle of said power rollers, said electronic system calculating said shift command value in accordance with said first and second physical quantities.

DETAILED DESCRIPTION OF THE INVENTION

Figure 1:
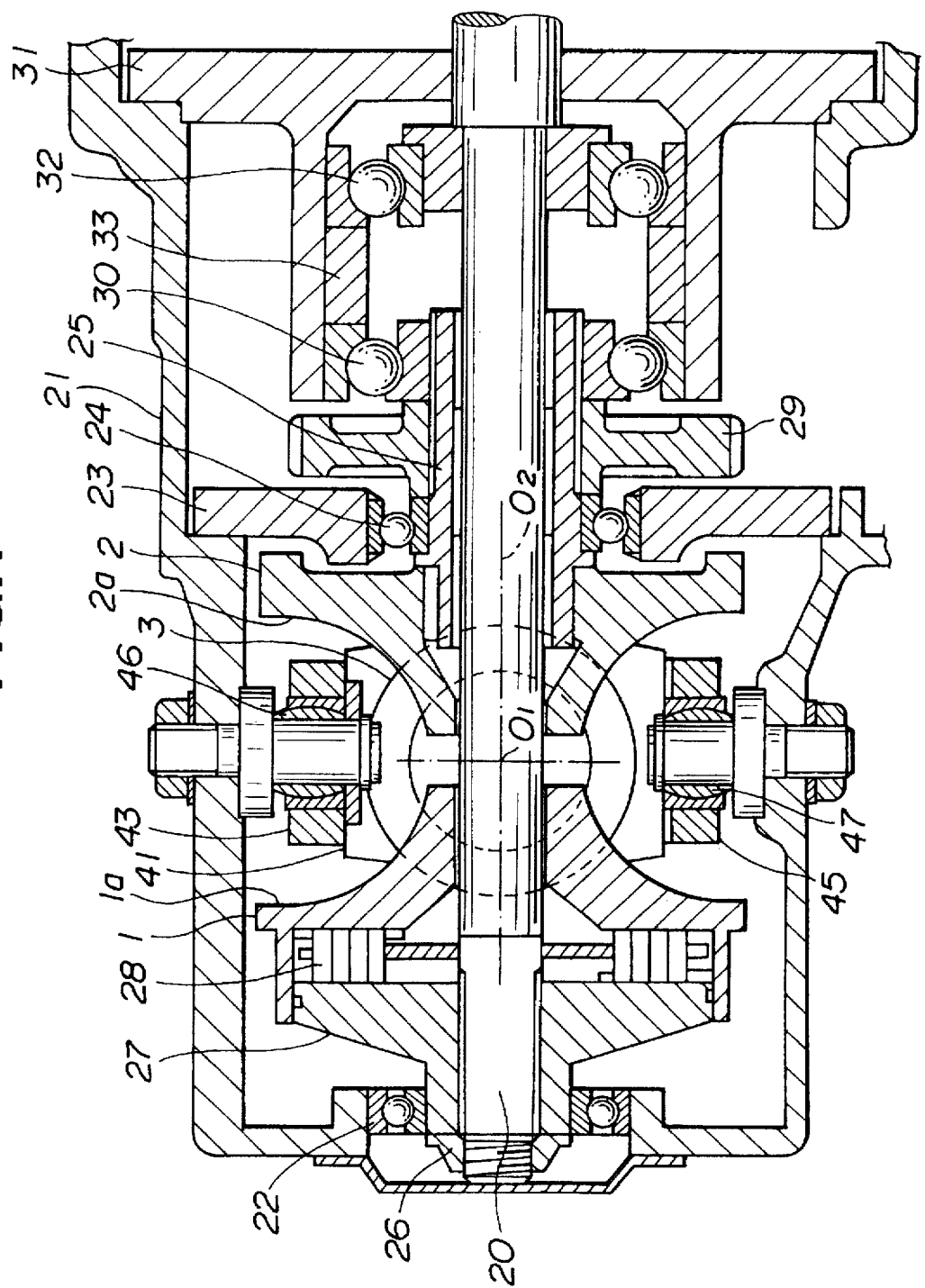
FIG. 1 is a longitudinal section showing a troidal continuously variable transmission to which the present invention is applied.

Referring to the drawings wherein like reference numerals designate like parts throughout the views, a description will be made with regard to preferred embodiments of a shift control system for an troidal continuously variable transmission.

Figure 2:
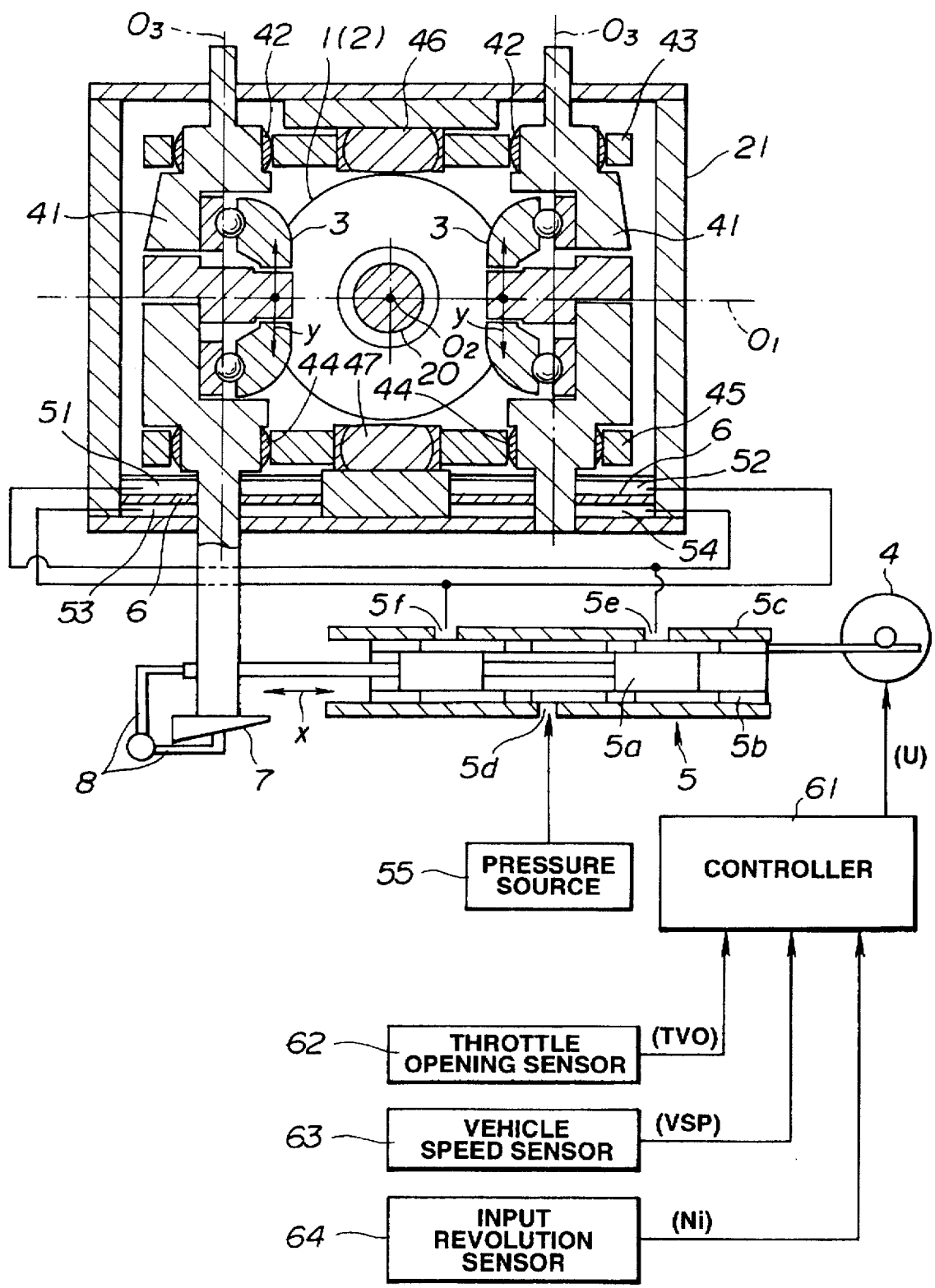
FIG. 2 is a cross section showing the troidal continuously variable transmission with a shift control system.

FIGS. 1–7 show a first embodiment of the present invention. Referring first to FIGS. 1 and 2, a troidal transmission unit comprises an input shaft 20 which receives rotation from an engine, not shown, and has an end portion which is distant from the engine and rotatably supported by a transmission casing 21 through a bearing 22, and a middle portion which is rotatably supported by an intermediate wall 23 of the transmission casing 21 through a bearing 24 and a hollow output shaft 25. Input and output discs 1, 2 are rotatably supported on the input shaft 20, and disposed so that troidal surfaces 1a, 2a are opposite to each other. A pair of power rollers 3 is interposed between the troidal surfaces 1a, 2a of the input and output discs 1, 2, and disposed opposite to each other across the input shaft 20. The following structure is adopted to hold the power rollers 3 between the input and output discs 1, 2:

A loading nut 26 is engaged with the end of the input shaft 20. A loading cam 28 is interposed between a cam disc 27 rotatably externally engaged with the input shaft 20 and stopped by the loading nut 26 and an end face distant from the troidal surface 1a of the input disc 1 so that rotation from the input shaft 20 to the cam disc 27 is transmitted to the input disc 1 through the loading cam 28. While rotation of the input disc 1 is transmitted to the output disc 2 through rotation of the power rollers 3, the loading cam 28 produces a thrust in proportion to transmitted torque so as to hold the power rollers 3 between the input and output discs 1, 2, enabling the above power transmission.

The output disc 2 is fixed on the output shaft 25, whereas an output gear 29 is externally engaged therewith for unitary rotation. Moreover, the output shaft 25 is rotatably supported by an end cover 31 of the transmission casing 21 through a radial-thrust bearing 30, and the input shaft 20 is also rotatably supported by the end cover 31 through a radial-thrust bearing 32. The radial-thrust bearings 30, 32 are abutted through a spacer 33 so as not to approach each other, and they contact the output gear 29 and the input shaft 20 axially so as not to have a relative displacement in the direction of separating from each other. Thus, a thrust of the loading cam 28 operating on the input and output discs 1, 2 becomes an internal force to hold the spacer 33, and fails to operate on the transmission casing 21.

As best seen in FIG. 2, each power roller 3 is rotatably supported by a trunnion 41 which has an upper end rotatably swingably connected to both ends of an upper link 43 through a spherical joint 42, and lower end rotatably swingably connected to both ends of a lower link 45 through a spherical link 44. The upper and lower links 43, 45 have a middle portion vertically swingably supported by the transmission casing 21 through spherical joints 46, 47, respectively, so as to vertically synchronously move the trunnions 41 in opposite directions.

Referring to FIG. 2, a description will be made with regard to a shift control system which ensures shifting by vertically synchronously moving the trunnions 41 in opposite directions. Each trunnion 41 is provided with a piston 6 for producing vertical strokes thereof, an upper chamber 51, 52 and a lower chamber 53, 54 being defined on both sides of the piston 6. A shift control valve 5 is arranged to ensure stroke control of the pistons 6 in opposite directions. The shift control valve 5 is provided with a spool-type inner valve element 5a and a sleeve-type outer valve element 5b which are slidably engaged with each other, the outer valve element 5b being slidably engaged with an outer valve casing 5c.

The shift control valve 5 has an input port 5d connected to a pressure source 55, and one communication port 5e connected to the piston chambers 51, 54, and another communication port 5f connected to the piston chambers 52, 53. The inner valve element 5a cooperates with a cam face of a precess cam 7 fixed to the lower end of one trunnion 41 through a bell-crank-type shift link 8 to drivingly engage the outer valve element 5b with a stepper motor 4 through a rack and pinion.

An operation command of the shift control valve 5 in the form of a stroke of the stepper motor 4 driven in accordance with a shift command value U is provided to the outer valve element 5b through the rack and pinion. When the outer valve element 5b is displaced from a neutral position to, e.g. a position as shown in FIG. 2 relative to the inner valve element 5a by the operation command, the piston chambers 52, 53 receive a fluid pressure from the pressure source 55, whereas the other piston chambers 51, 54 are drained. On the other hand, when the outer valve element 5b is displaced from the neutral position to a position opposite to that as shown in FIG. 2 relative to the inner valve element 5a, the piston chambers 51, 54 receives a fluid pressure from the pressure source 55, whereas the piston chambers 52, 53 are drained. Thus, the trunnions 41 are hydraulically vertically displaced in opposite directions as viewed in FIG. 2 through the pistons 6. By this, the power rollers 3 are offset by y with respect to a position as shown in FIG. 2 wherein a rotation axis $o_1$ thereof and a rotation axis $o_2$ of the input and output discs 1, 2 cross each other, which produces tilting of the power rollers 3 by $\phi$ about an oscillating axis $o_3$ perpendicular to the rotation axis $o_1$ due to an oscillating component force out of the input and output discs 1, 2, enabling continuous shifting.

During such shifting, the precess cam 7 connected to the lower end of one trunnion 41 feeds back mechanically to the inner valve element 5a of the shift control valve 5 the above vertical movement or offset amount y of the trunnions 41 and the power rollers 3, and the tilting angle $\phi$ through the shift link 8. When achieving the shift command value U to the stepper motor 4 through the above continuous shifting, the mechanical feedback via the precess cam 7 makes the inner valve element 5a of the shift control valve 5 return to the initial neutral position relative to the outer valve element 5b, and at the same time, the power rollers 3 are returned to the position as shown in FIG. 2 wherein the rotation axis $o_1$ thereof and the rotation axis $o_2$ of the input and output discs 1, 2 cross each other, enabling maintaining of the shift command value as achieved.

Since control aims to set the power roller tilting angle $\phi$ to a value corresponding to a target speed ratio, the precess cam 7 needs only to feed back the power roller tilting angle $\phi$, in principle. The reason why not only the power roller tilting angle $\phi$, but the power roller offset amount y are fed back is to obtain a damping effect for preventing vibratile shift control, and thus avoid a hunting phenomenon of shift control.

Figure 3:
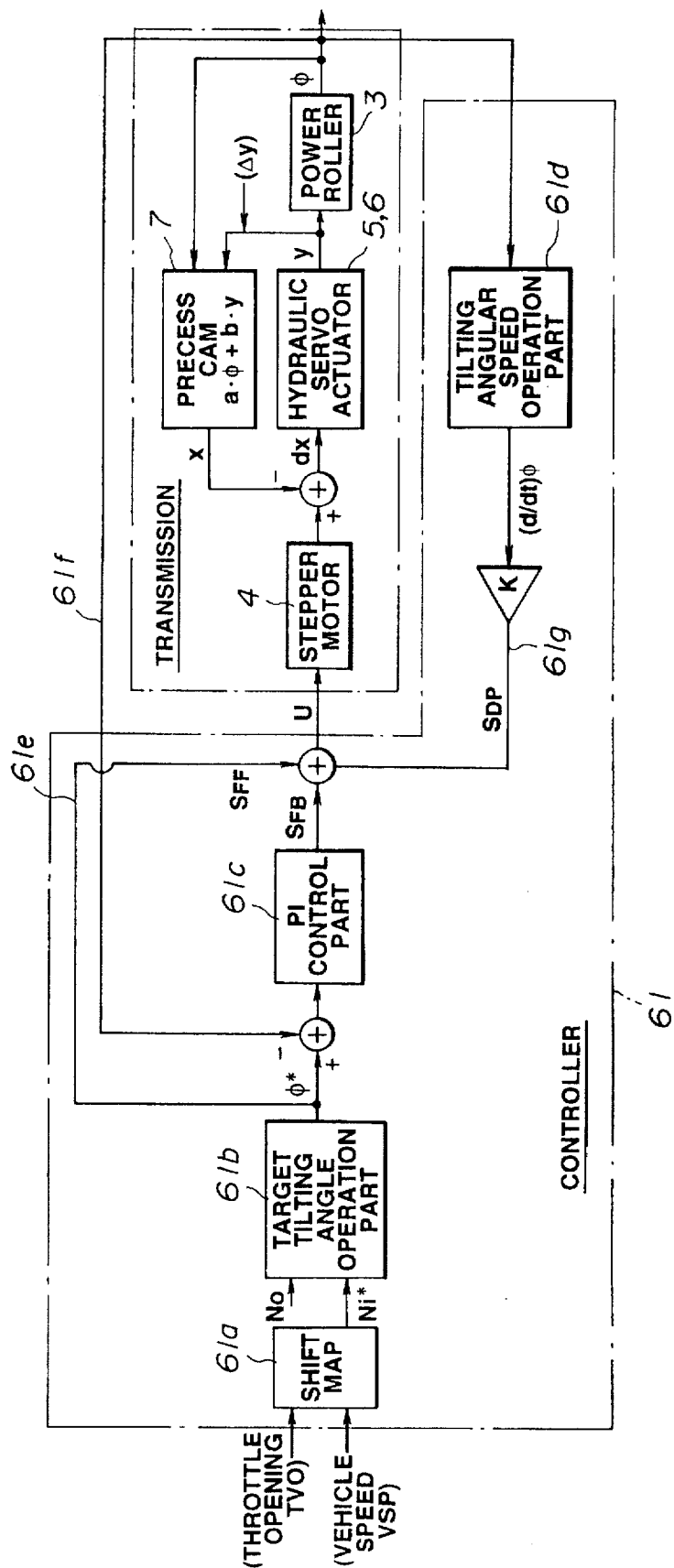
FIG. 3 is a block diagram showing a first preferred embodiment of a shift control system according to the present invention.

The shift command value U to the stepper motor 4 is determined by a controller 61 which constitutes a shift command value operation system, and to which are input a signal out of a throttle opening sensor 62 for detecting an engine throttle opening degree TVO, a signal out of a vehicle speed sensor 63 for detecting a vehicle speed VSP, and a signal out of an input revolution sensor 64 for detecting a transmission input revolution $N_i$ which may be replaced with an engine revolution $N_e$. The controller 61 determines the shift command value U to the stepper motor 4 based on such input information and in accordance with the following operation:

Referring to FIG. 3, according to the first embodiment, for solving, particularly, the aforementioned torque shift produced due to the fact that the precess cam 7 feeds back not only the power roller tilting angle φ, but the power roller offset amount y, the controller 61 is constructed as shown in FIG. 3. A mechanical feedback shift control system through the precess cam 7 in the transmission is seen in FIG. 3, which is similar to that one as described above in connection with the prior art. For the aforementioned reasons, the coefficient b pertinent to the power roller offset amount y determined by the shift link 8 is limited to a minimum required in view of fail safe.

The controller 61 includes a shift map 61a as previously stored, a target tilting angle operation part 61b, a proportional-plus-integral (PI) control part 61c which constitutes a first electronic feedback system 61f, and a tilting angular speed operation part 61d which forms a part of a second electronic feedback system 61g and constitutes means for estimating a power roller tilting angular speed. The controller 61 determines a target transmission input revolution $N_i^*$ out of the throttle opening degree TVO and the vehicle speed VSP in accordance with the shift map 61a, then, calculates, in the target tilting angle operation part 61b, a target power roller tilting angle φ* out of the target transmission input revolution $N_i^*$ and a transmission output revolution $N_o$.

The controller 61 outputs to a feedforward system 61e a feedforward step number $S_{FF}$ of the stepper motor 4 corresponding to the target power roller tilting angle φ*. Moreover, the controller 61 determines, in the PI control part 61c, a feedback step number $S_{FB}$ corresponding to a deviation of the power roller tilting angle φ out of a feedback system 61f from the target tilting angle φ*. In view of the fact that the disturbance Δy causing the torque shift is great as described above, a proportional gain of feedback control ensured in the PI control part 61c is set to a great value so that the power roller tilting angle φ converges to the target power roller tilting angle φ* with excellent responsibility.

When enlarging the proportional gain of feedback control in such a way, however, the stability of the shift control system is deteriorated as described above, producing a hunting of shift control during a period of transition. For avoiding this, the controller 61 determines, in the tilting angular speed operation part 61d, a rate of change (d/dt)φ of the power roller tilting angle φ with respect to time, which is multiplied by a gain K to obtain a damping step number $S_{DP}$=K·(d/dt)φ which is output to the second electronic feedback system 61g.

The controller 61 provides a total of the feedforward step number $S_{FF}$, the feedback step number $S_{FB}$, and the damping step number $S_{DP}$ as a shift command value or step number U. At that time, the stepper motor 4 is driven stepwise in response to the shift command value U so as to displace the outer valve element 5b of the shift control valve 5 by $X_{SP}$ relative to the inner valve element 5a thereof from the neutral position. Thus, a hydraulic servo actuator comprising the shift control valve 5 and the piston 6 makes the power rollers 3 be offset by y, which produces tilting of the power rollers 3 by φ. With this tilting φ, the transmission input revolution $N_i$ determined in connection with the transmission output revolution $N_o$ is varied to approach the target input revolution $N_i^*$, enabling a predetermined shifting.

During shifting, the precess cam 7 feeds back the power roller offset amount y and the power roller tilting angle φ to the inner valve elements 5a of the shift control valve 5, which is thus moved by X to follow the above displacement of the outer valve element 5b, decreasing a relative displacement between the inner and outer valve elements 5a, 5b of the shift control valve 5 to dx. The relative displacement dx becomes smaller with a progress of shifting, and, finally, 0 when the above shift command value is achieved. At that time, the inner and outer valve elements 5a, 5b of the shift control valve 5 are relatively returned to the initial neutral position, enabling maintaining of the shift command value as achieved.

Since the mechanical feedback system including the precess cam 7 and the shift link 8 feeds back not only the power roller tilting angle φ, but the power roller offset amount y, the torque shift may be produced due to the offset-direction relative displacement Δy between the power roller 3 and the precess cam 7. However, upon determination of the shift command value U, the power roller tilting angle φ is electronically fed back via the feedback system 61f to carry out the determination by PI control in response to a deviation of the power roller tilting angle φ from the target tilting angle φ*, so that the relative displacement Δy is not fed back, enabling a solution of the torque shift.

Figure 9:
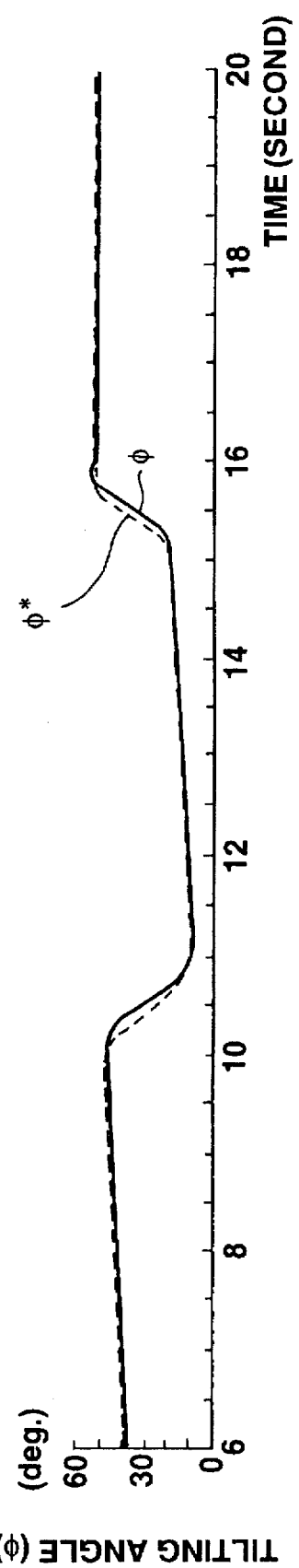
FIG. 9 is a time chart illustrating a simulation result of a torque shift produced by the system as shown in FIG. 3.

For realizing a solution of the torque shift with sufficient responsibility, the proportional gain of PI control should be enlarged as described above in view of the fact that the offset-direction relative displacement Δy is considerably great. In that case, however, shift control is unstable due to a hunting produced during a period of transition. On the other hand, according to the first embodiment, the tilting angular speed operation part 61d determines the tilting angular speed (d/dt)φ by carrying out the differentiation of the first order of the power roller tilting angle φ so as to correct, with a feedback corresponding thereto, the shift command value U by the damping step number $S_{DP}$=K·(d/dt)φ. Thus, referring to FIG. 9, the power roller tilting angle φ as indicated by fully-drawn line is changed with respect to the target power roller tilting angle φ* as indicated by broken line, eliminating the problem of a hunting of shift control produced during a period of transition.

As seen from the foregoing, according to the first embodiment, the first electronic feedback system 61f and the second electronic feedback system 61g can make the power roller tilting angle φ to correspond to the target tilting angle φ* without producing any torque shift and with sufficient responsibility and stability. The mechanical feedback system including the precess cam 7 and the shift link 8 are not necessarily be arranged, however, it is kept for fail safe in case that the electronic feedback system does not function due to a trouble, etc. It is noted that since the mechanical feedback system feeds back the relative displacement Δy which causes the torque shift, the shift link 8 is constructed so that the coefficient b pertinent to Δy is a minimum required in view of fail safe as described above.

In the first embodiment, the power roller tilting angle φ itself is fed back to the first electronic feedback system 61f, alternatively, the other physical quantity indicative of the power roller tilting angle φ may be fed back thereto. The other physical quantity is, for example, a speed ratio i obtained from a revolution ratio of the input disc 1 to the output disc 2 due to the fact that the speed ratio i is determined by the power roller tilting angle φ, or the transmission input revolution $N_i$ considering that the vehicle speed, i.e. the revolution of the output disc 2 is not varied during shifting, by which the above effect can be achieved.

Figure 4:
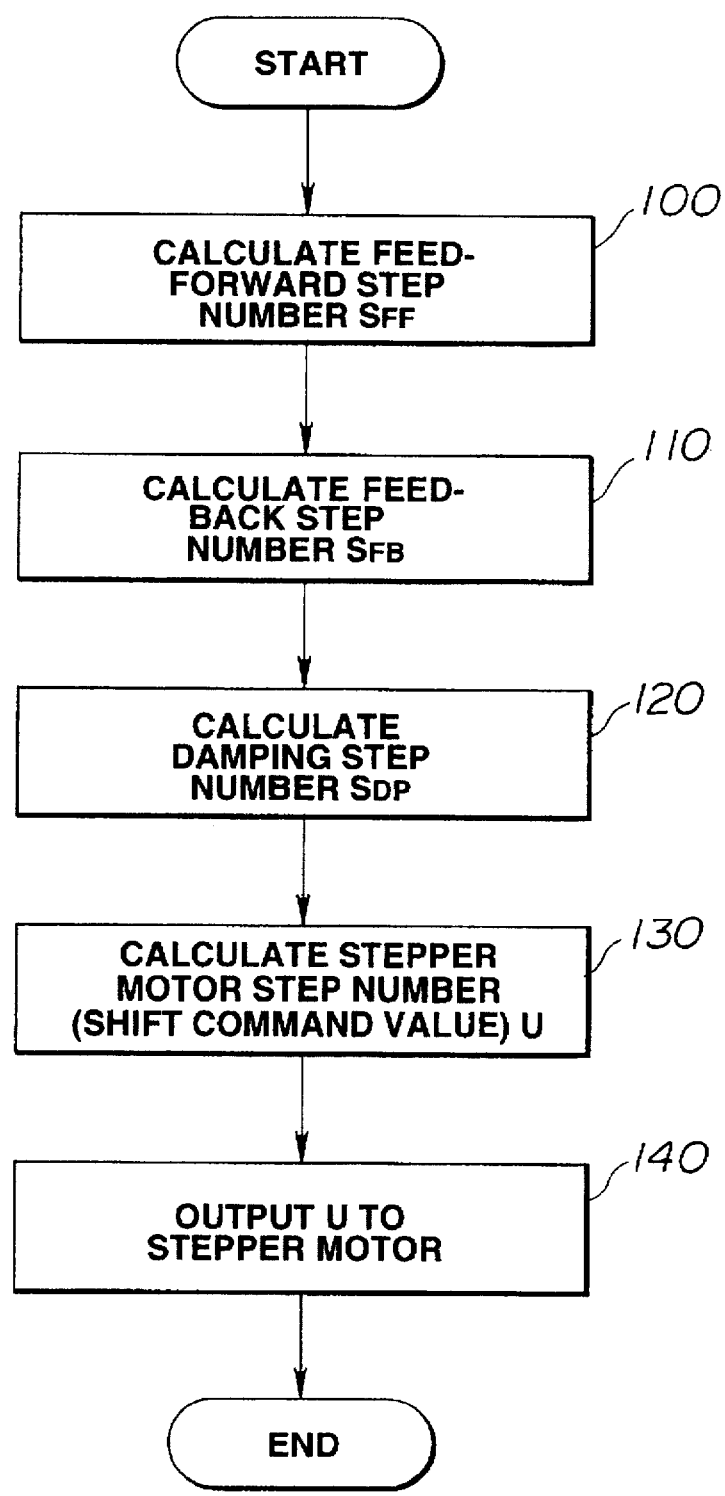
FIG. 4 is a flowchart showing a main routine of a shift command value determination program.
Figure 5:
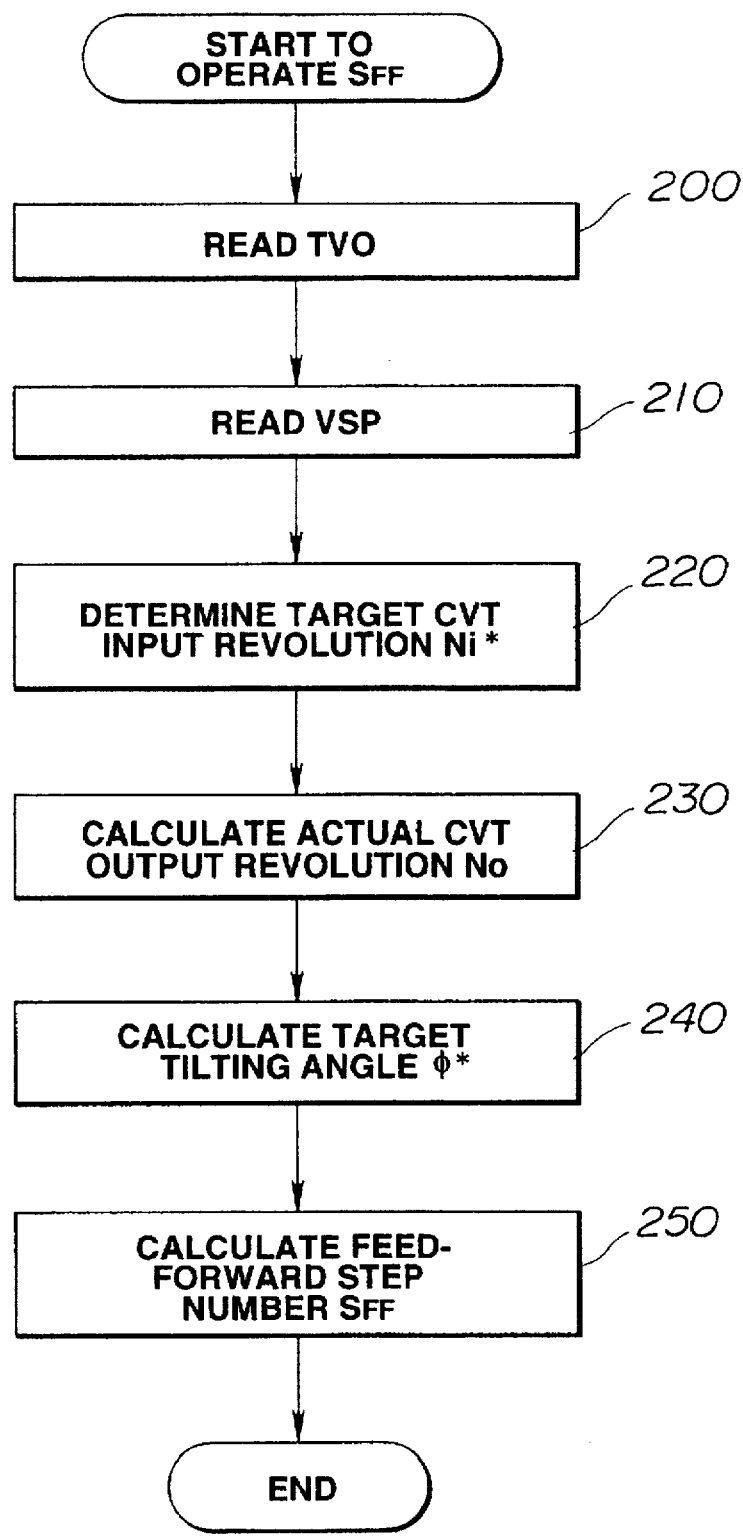
FIG. 5 is a view similar to FIG. 4, showing a feedforward step number determination program in the shift command value determination program.
Figure 6:
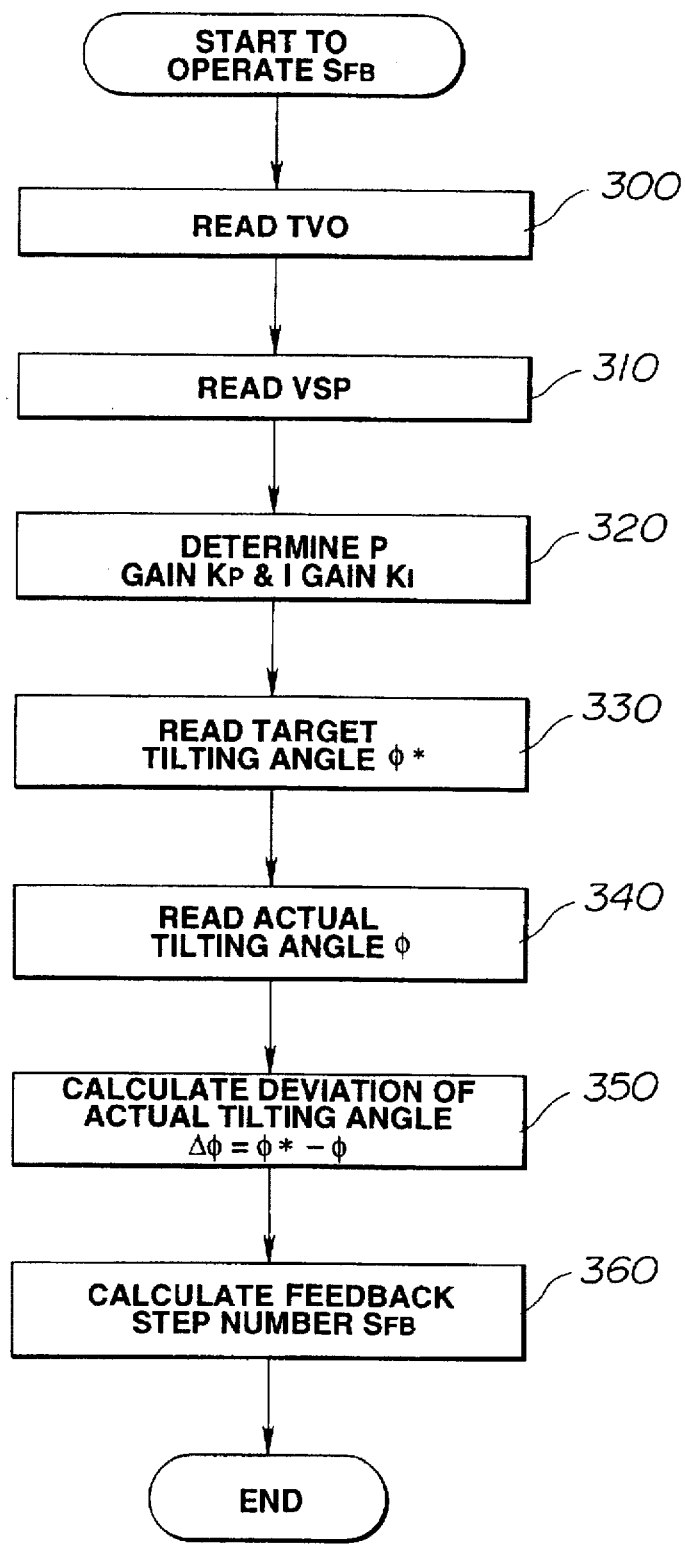
FIG. 6 is a view similar to FIG. 5, showing a feedback step number determination program in the shift command value determination program.
Figure 7:
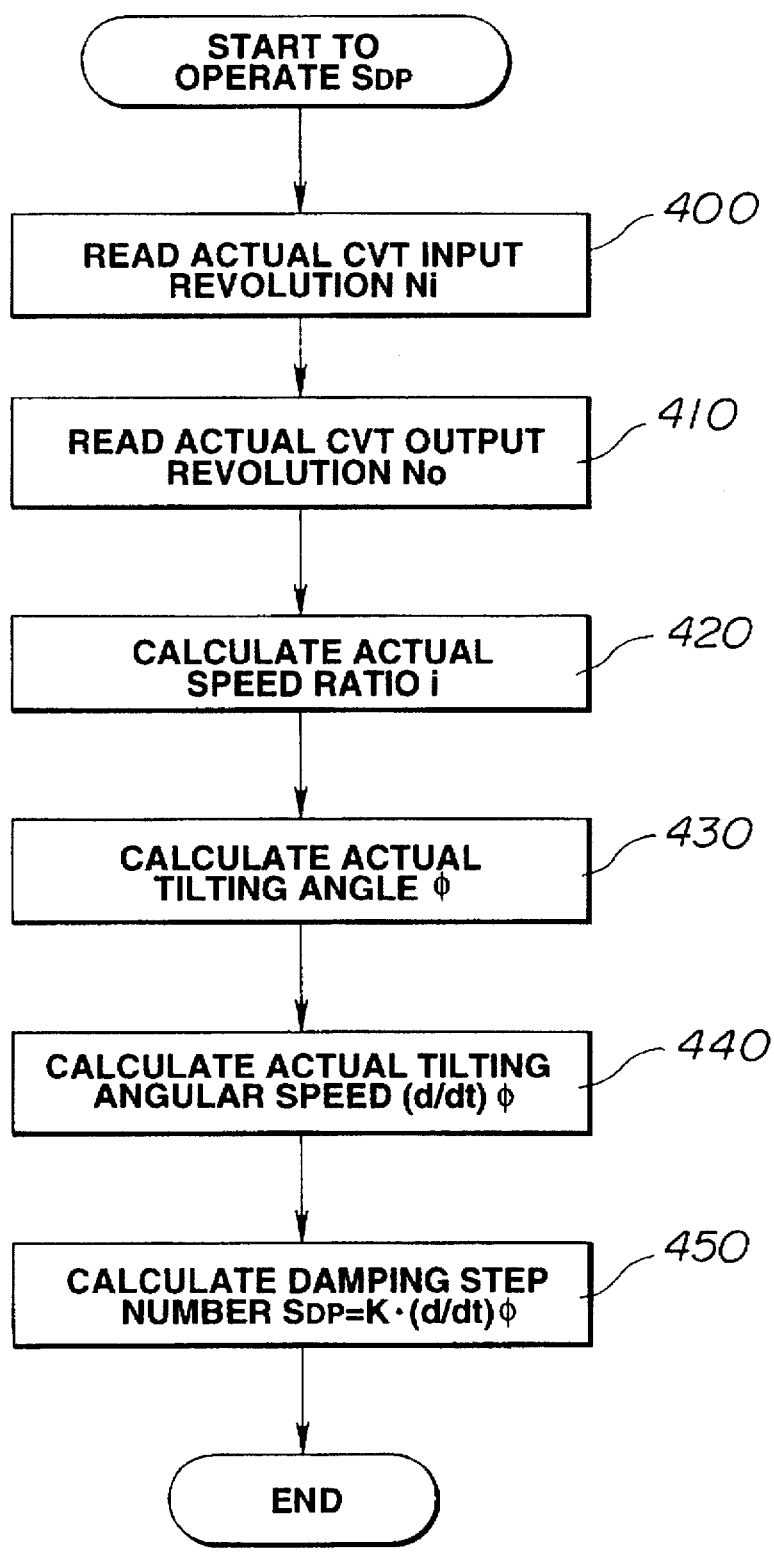
FIG. 7 is a view similar to FIG. 6, showing a damping step number determination program in the shift command value determination program.

Referring to FIGS. 4–7, when constructed by a microcomputer, the controller 61 executes a control program for achieving the above effect. Referring to FIG. 4, at a step 100, the feedforward step number $S_{FF}$ is calculated through a subroutine as shown in FIG. 5. At a step 110, the feedback step number $S_{FB}$ is calculated through a subroutine as shown in FIG. 6. At a subsequent step 120, the damping step number $S_{DP}$ is calculated through a subroutine as shown in FIG. 7.

Referring to FIG. 5, upon calculation of the feedforward step number $S_{FF}$, at steps 200 and 210, the throttle opening degree TVO and the vehicle speed VSP are read in a memory, respectively. At a step 220, the target transmission input revolution $N_i^*$ is obtained out of the throttle opening degree TVO and the vehicle speed VSP and in accordance with the shift map 61a as shown in FIG. 3. At a subsequent step 230, the transmission output revolution $N_o$ is calculated out of the vehicle speed VSP considering a final drive gear ratio. At a step 240, a corresponding target power roller tilting angle $\phi^*$ is calculated out of a target speed ratio $N_i^*/N_o$ known from the target transmission input revolution $N_i^*$ and the transmission output revolution $N_o$. Then, at a step 250, the feedforward step number $S_{FF}$ of the stepper motor 4 is calculated to achieve the target power roller tilting angle $\phi^*$.

Referring to FIG. 6, upon calculation of the feedback step number $S_{FB}$, at steps 300 and 310, the throttle opening degree TVO and the vehicle speed VSP are read in the memory, respectively. At a step 320, a proportional (P) gain $K_P$ and an integral (I) gain $K_I$ of the PI control part 61c as shown in FIG. 3 are retrieved and determined out of the throttle opening degree TVO and the vehicle speed VSP and in accordance with a gain map as previously established. At a step 330, the target power roller tilting angle $\phi^*$ obtained at the step 240 is read in the memory, whereas, at a step 340, the power roller tilting angle $\phi$ is read in the memory. It is noted that, as for reading of the power roller tilting angle $\phi$, the speed ratio i is obtained out of the transmission input revolution $N_i$ and the transmission output revolution $N_o$ known from the vehicle speed VSP, from which the power roller tilting angle $\phi$ can be estimated. At a subsequent step 350, the deviation is a $\Delta\phi$ of the power roller tilting angle $\phi$ from the target tilting angle $\phi^*$. At a step 360, the deviation $\Delta\phi$ and its integral value are multiplied by the proportional gain $K_P$ and the integral gain $K_I$, respectively, which are added up to calculate the feedback step number $S_{FB}$.

Referring to FIG. 7, upon calculation of the damping step number $S_{DP}$, at steps 400 and 410, the transmission input revolution $N_i$ and the transmission output revolution $N_o$ are read in the memory, respectively, base on which, at a step 420, the speed ratio i=$N_i/N_o$ is calculated. At a subsequent step 430, the power roller tilting angle $\phi$ is estimated from the speed ratio i. At a step 440, the rate of change of the power roller tilting angle $\phi$ with respect to time or tilting angular speed (d/dt)$\phi$ is calculated. It is noted that, as for calculation of the power roller tilting angular speed (d/dt)$\phi$, a variation in the power roller tilting angle $\phi$ is obtained during one operation cycle in FIG. 7, which can be used as the power roller tilting angular speed (d/dt)$\phi$. Here, a low-pass filter may be arranged considering that the differential value of the power roller tilting angle $\phi$ is greater. Then, at a step 450, the damping step number $S_{DP}$ is calculated by $S_{DP}= K \cdot (d/dt)\phi$.

Returning to FIG. 4, at a step 130, the feedforward step number $S_{FF}$, the feedback step number $S_{FB}$, and the damping step number $S_{DP}$ are added up to obtain the shift command value U=$S_{FF}$+$S_{FB}$+$S_{DP}$, which is output, at a step 140, to the stepper motor 4 for shifting.

Figure 8:
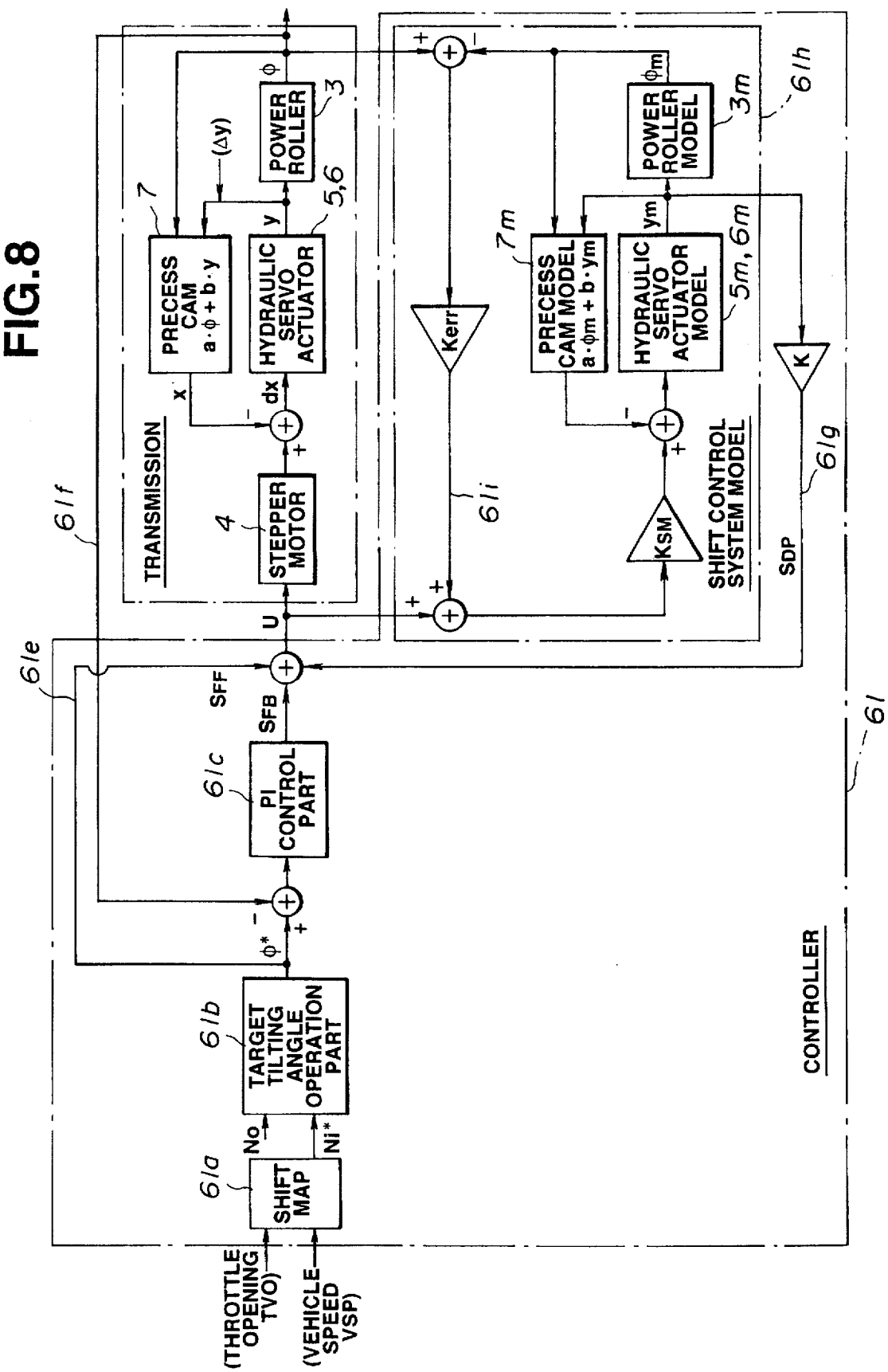
FIG. 8 is a view similar to FIG. 3, showing a second preferred embodiment of the present invention.

FIG. 8 shows a second embodiment of the present invention. In the second embodiment, an estimated value $y_m$ of the power roller offset amount y which is indicative of the power roller tilting angular speed (d/dt)$\phi$ serves as a physical quantity to be fed back to the second electronic feedback system 61g. Now, a demonstration will be shown with regard to the fact that the power roller offset amount y is indicative of the power roller tilting angular speed (d/dt)$\phi$, and the estimated value $y_m$ of the power roller offset amount y can be fed back in place of the power roller tilting angular speed (d/dt)$\phi$.

As for the troidal continuously variable transmission, it is known that the relation given by the following formula is established between the power roller offset amount y and the power roller tilting angle $\phi$.

$$(d/dt)\phi = f \times y \tag{1}$$

wherein $$f = [\cos(\theta-\phi)(1+\eta-\cos\phi)]\Omega_o/[1+\eta-\cos(2\theta-\phi)] \tag{2}$$

wherein $\Omega_o$ is a revolution of the output disc 2, and $\eta$ and $\theta$ are constants for the structure determined at a design stage of the troidal continuously variable transmission.

The above formulae demonstrate that the power roller offset amount y is a function of the power roller tilting angular speed (d/dt)$\phi$, and that even if the estimated value $y_m$ of the power roller offset amount y is fed back to the second electronic feedback system 61g in place of the power roller tilting angular speed (d/dt)$\phi$, the same effect as in the first embodiment can be achieved.

In the second embodiment, a model 61h is arranged as means for estimating the power roller offset amount in place of the tilting angular speed operation part 61d as shown in FIG. 3. The model 61h is a model which gives the mechanical feedback shift control system including the precess cam 7 in the troidal continuously variable transmission by a numerical formula. Therefore, the model 61h can be shown by a block diagram in FIG. 8 including a power roller model 3m, a hydraulic servo actuator model 5m, 6m, and a precess cam model 7m. When providing the shift command value U in accordance with a gain $K_{SM}$, the hydraulic servo actuator model 5m, 6m makes the power roller model 3m be offset, which produces a tilting $\phi_m$ in accordance with the offset amount estimated value $y_m$. The offset amount estimated value $y_m$ and tilting angle estimated value $\phi_m$ of the power roller model 3m are fed back via the precess cam model 7m, obtaining the tilting angle estimated value $\phi_m$ corresponding to the shift control value U under a damping effect due to the offset amount estimated value $y_m$ as fed back.

If the shift control system model 61h fully corresponds to the mechanical feedback shift control system, and has no modeling error, the tilting angle estimated value $\phi_m$ is equal to the tilting angle $\phi$. It will be understood that a deviation of the tilting angle estimated value $\phi_m$ from the tilting angle $\phi$ shows the modeling error. Thus, a modeling error correction system 61i is added to the shift control system model 61h so as to correct an input thereto by a value obtained by multiplying the modeling error by a coefficient $K_{err}$.

In the second embodiment, the damping step number $S_{DP}$ is calculated by multiplying the offset amount estimated value $y_m$ produced in the shift control system model 61h by the gain K, which is fed back to the second electronic feedback system 61g. Since the power roller offset amount y (and thus, the estimated value $y_m$) is a function of the power roller tilting angular speed (d/dt)$\phi$, the second embodiment wherein, in place of the power roller tilting angular speed (d/dt)$\phi$ in the first embodiment, the offset amount estimated value $y_m$ is fed back to the second electronic feedback system 61g can produce the same effect as in the first embodiment. When feeding back the power roller tilting angular speed $(d/dt)\phi$ as in the first embodiment, a differential operation is needed, so that the operation result is apt to include a noise. On the other hand, when feeding back the power roller offset amount estimated value $y_m$ as in the second embodiment, the operation result includes less noise.

It is noted that, in place of the power roller tilting angular speed $(d/dt)\phi$ and the power roller offset amount estimated value $y_m$, the other physical quantity indicative of the power roller tilting angular speed $(d/dt)\phi$ may be fed back to the second electronic feedback system 61g. The other physical quantity indicative of the power roller tilting angular speed $(d/dt)\phi$ is, for example, a speed of change of the speed ratio determined out of a ratio of the transmission input revolution $N_i$ to the transmission output revolution $N_o$, or a speed of change of the transmission input revolution $N_i$ considering that the vehicle speed VSP (and thus, the transmission output revolution $N_o$) is constant during a short period of shifting, or a speed of change of the transmission output revolution $N_o$ when cruising with the speed ratio constant.

When using the other physical quantity, there are arranged means for estimating a speed of change of the speed ratio, means for operating a speed of change of the transmission input revolution $N_i$, and means for operating a speed of change of the transmission output revolution $N_o$, not shown, to ensure, in accordance with signals derived therefrom a feedback to the second electronic feedback system 61g.

Figure 10:
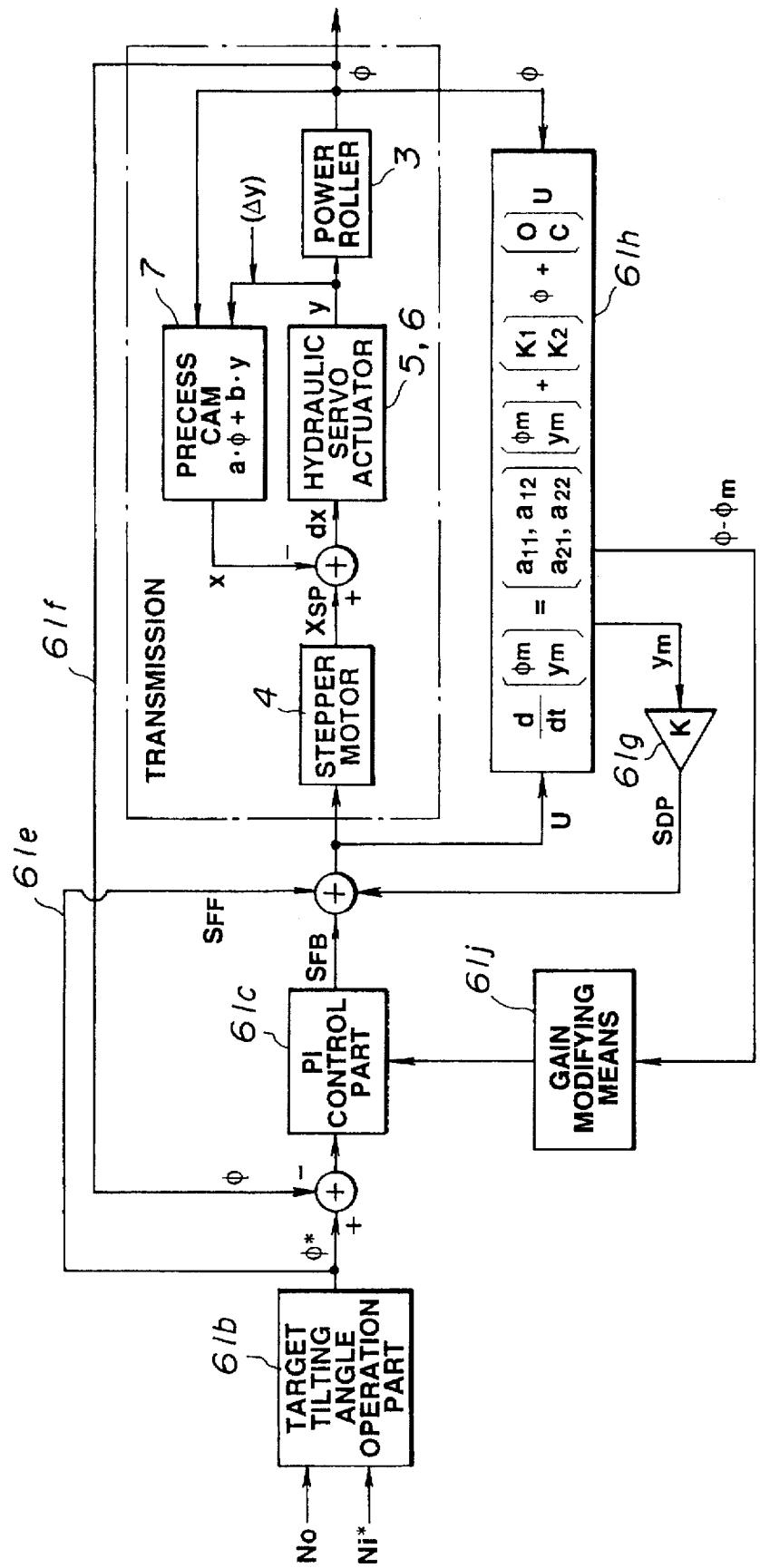
FIG. 10 is a view similar to FIG. 8, showing a third preferred embodiment of the present invention.
Figure 12:
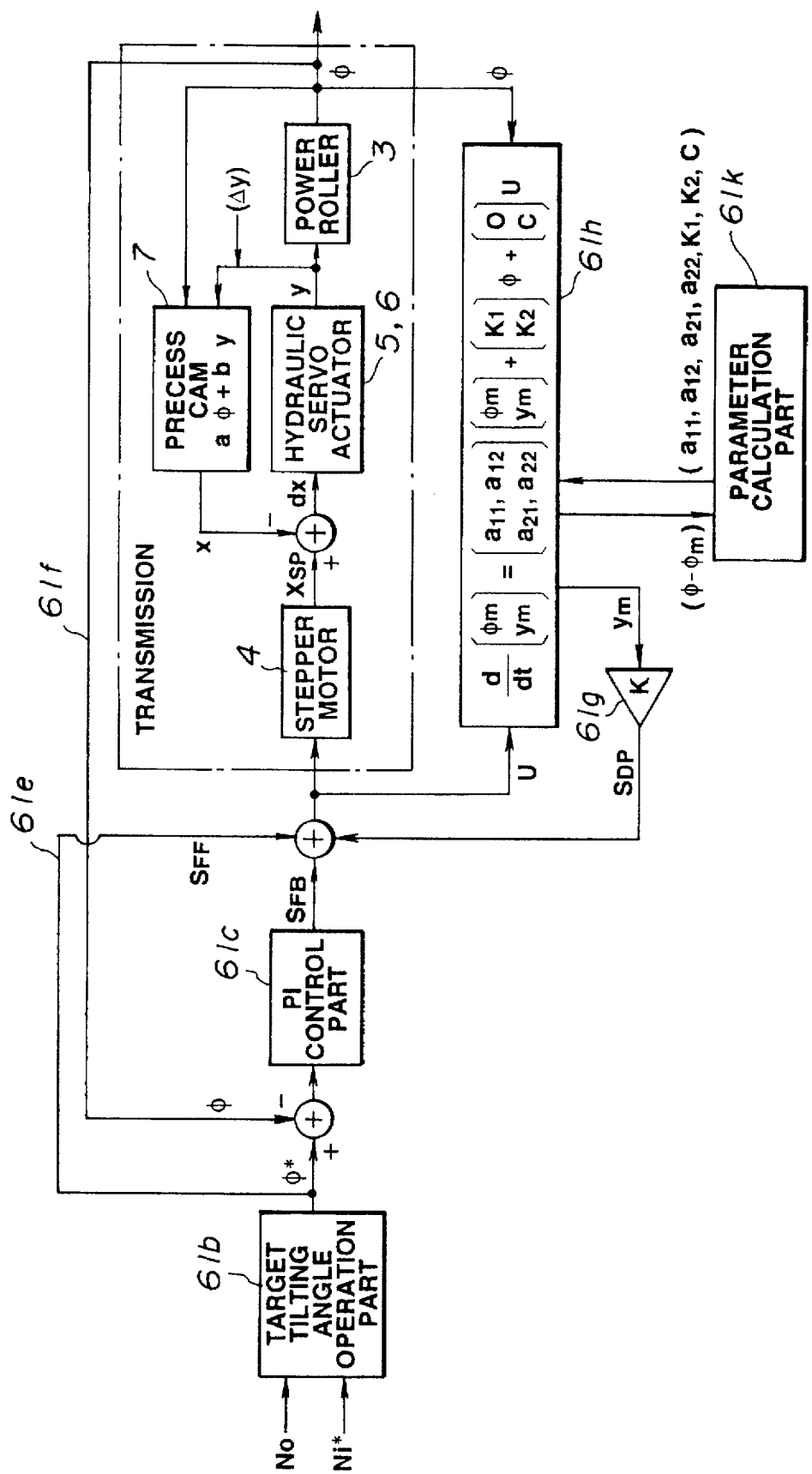
FIG. 12 is a view similar to FIG. 10, showing a fourth preferred embodiment of the present invention.
Figure 14:
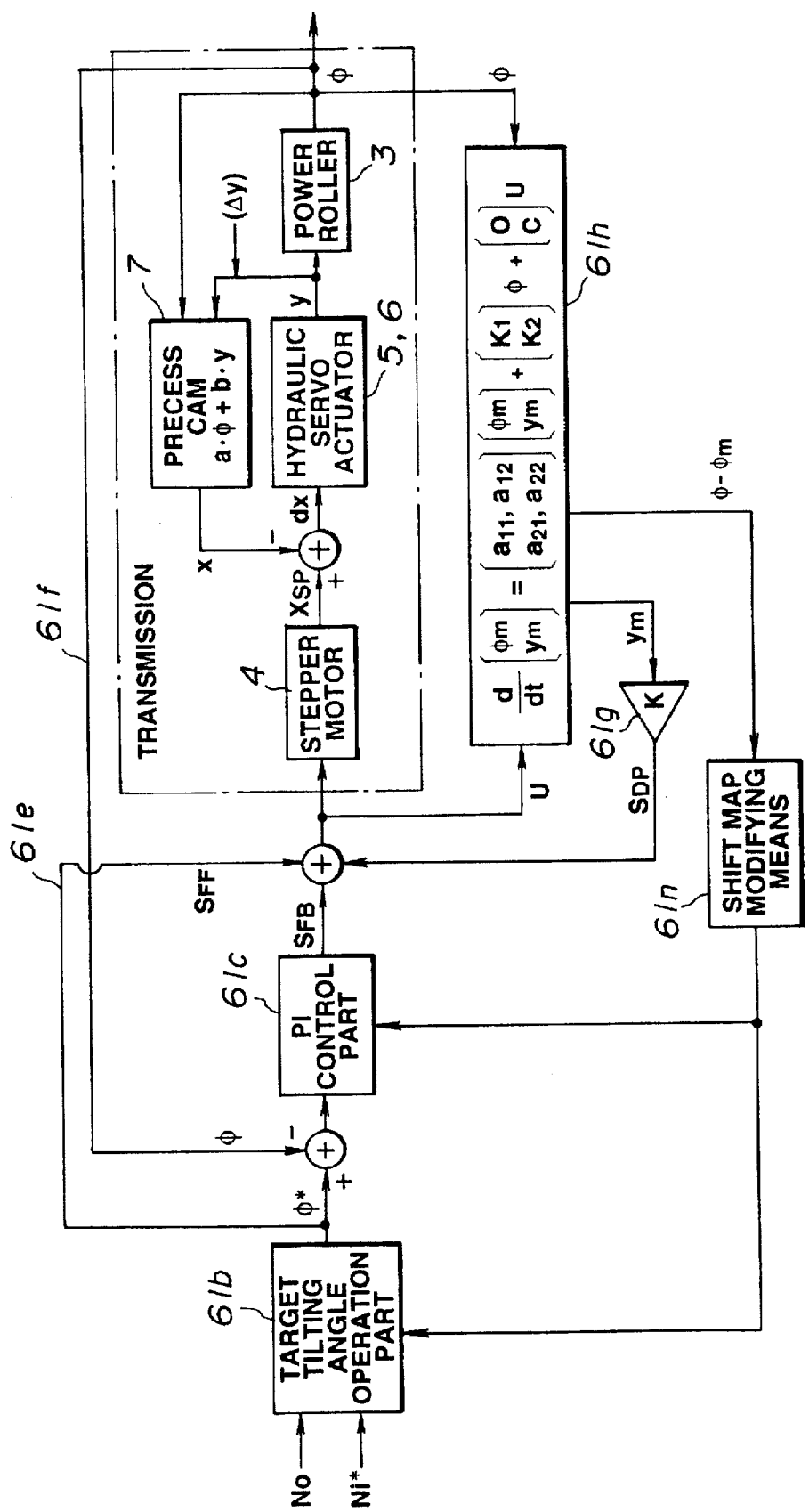
FIG. 14 is a view similar to FIG. 12, showing a fifth preferred embodiment of the present invention.

Referring to FIGS. 10, 12, and 14, a description will be made with regard to measures to prevent impossible or irresponsible shift control even if the feedback shift control system model 61h produces a modeling error for some reason.

A hydraulic circuit for controlling the power rollers 3 can be constructed to show, when having as an input an opening degree of the shift control valve 5, and as an output the power roller offset amount y, a characteristic which can approximate the relation between the input and the output to a pure integral. Under these conditions, if the function f is a constant, the power roller offset amount estimated value $y_m$ can be calculated out of the following formulae known as a state estimation observer in the theory of control:

$$(d\phi_m/dt) = a_{11} \times \phi_m + a_{12} \times y_m + k_1 \times \phi \quad (3)$$

$$(dy_m/dt) = a_{21} \times \phi_m + a_{22} \times y_m + k_2 \times \phi + c \times U \quad (4)$$

Therefore, the feedback shift control system model 61h can be given by a determinant as shown in FIGS. 10, 12, or 14 wherein $a_{11}$, $a_{12}$, $a_{21}$, $a_{22}$, $k_1$, $k_2$, and c are predetermined values calculated out of a feedback gain of the mechanical feedback system including the precess cam 7, the function f, and the pole of the state estimation observer as a design value, and U is a signal output by a speed ratio control mechanism, i.e. a step number to be provided to the stepper motor 4 in the embodiments, c serving as a conversion factor connecting the signal or step number with a stroke position of the shift control valve 5.

When a feedback gain of the tilting angle $\phi$ produced by the mechanical feedback system including the precess cam 7 is a, a feedback gain of the power roller offset amount y is b, and the pole of the state estimation observer as a design value is $\omega$, the above predetermined values are given as follows:

$$a_{11} = -k_1$$

$$a_{12} = f$$

$$a_{21} = -(k_2 + a)$$

$$k_1 = 2 \times \omega - b$$

$$k_2 = (\omega^2 - k_1 \times b)/f - a$$

It is noted that, even when a troidal continuously variable transmission to be controlled is different in structure from the above transmission, the power roller offset amount y can be estimated in the same way by experimentally determining the formulae (1) and (2), and the relation between an input to be provided and the power roller offset amount y.

In a third embodiment as shown in FIG. 10, input to a gain modifying means 61j is a modeling error given by the deviation of the power roller tilting angle $\phi$ from the estimated power roller tilting angle $\phi_m$ of the observer. If a quantity indicative of the relation between the power roller offset amount y and the power roller tilting angle $\phi$ is a constant, the observer is ensured to be converged. However, this quantity is actually a function (function f), and can be different from the function f as previously set due to change of the relation between the two by operation conditions of the troidal continuously variable transmission, dynamic interference from the outside, etc. Thus, the offset amount estimated value $y_m$ and tilting angle estimated value $\phi_m$ of the observer are not ensured to be a correct value, producing the above modeling error.

Figure 11:
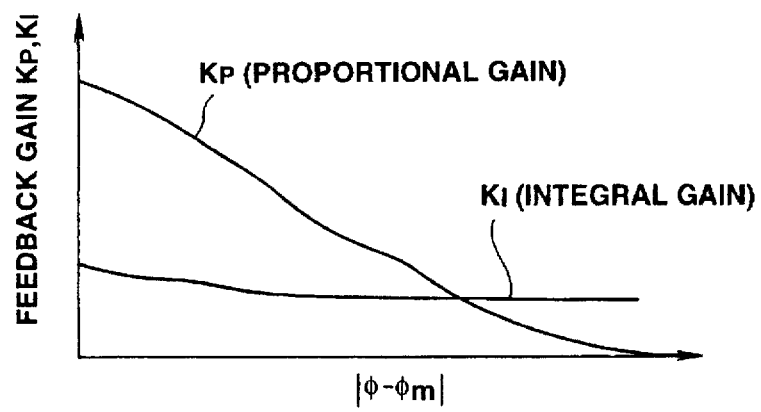
FIG. 11 is a graph illustrating a feedback gain modifying characteristic obtained by the system as shown in FIG. 10.

Referring to FIG. 11, according to the third embodiment, if the deviation of the tilting angle $\phi$ from the tilting angle estimated value $\phi_m$ of the observer is greater than a predetermined value, the gain modifying means 61j decreases both the proportional gain $K_P$ and integral gain $K_I$ which are feedback gains of the PI control part 61c considering that the observer does not function correctly. This prevents vibratile shift control when the observer outputs an incorrect offset amount estimated value $y_m$.

According to a fourth embodiment as shown in FIG. 12, the deviation of the tilting angle $\phi$ from the tilting angle estimated value $\phi_m$ of the observer is watched by a parameter calculation part 61k as means for modifying model elements. If this deviation is greater than a predetermined value, the parameter calculation part 61k can modify elements which constitutes the observer considering that a characteristic of the troidal continuously variable transmission is changed so that the observer converges correctly in the characteristic as changed.

Figure 13:
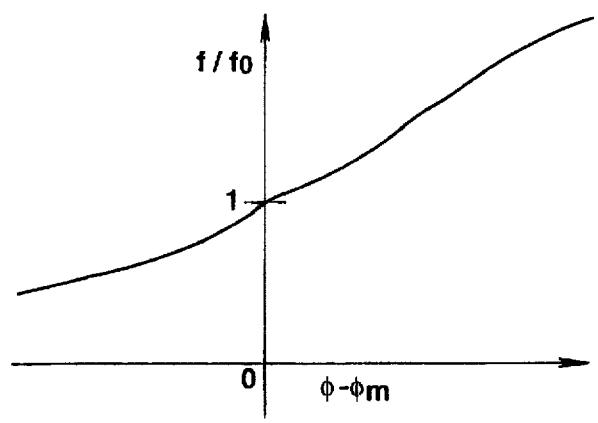
FIG. 13 is a view similar to FIG. 11, illustrating a model parameter modifying characteristic obtained by the system as shown in FIG. 12.

Specifically, the parameter calculation part 61k modifies a value of the function f given by the formula (2) based on the relation as shown in FIG. 13 in accordance with the deviation $\phi - \phi_m$ to calculate the parameters $a_{11}$, $a_{12}$, $a_{21}$, $a_{22}$, $k_1$, $k_2$, and c which are provided to the feedback shift control system model 61h. Referring to FIG. 13, $f_o$ is a design value or an ideal value as experimentally obtained.

It is noted that the parameter calculation part 61k can be constructed to use a temperature and pressure of working fluid within the troidal continuously variable transmission, a throttle opening degree, a time series change of $\phi$ and $\phi_m$, etc.

According to the fourth embodiment, also, when the observer outputs an incorrect offset amount estimated value $y_m$, it is possible to make the observer converge immediately to a correct value, preventing vibratile shift control in accordance with an incorrect estimated value $y_m$.

Figure 15:
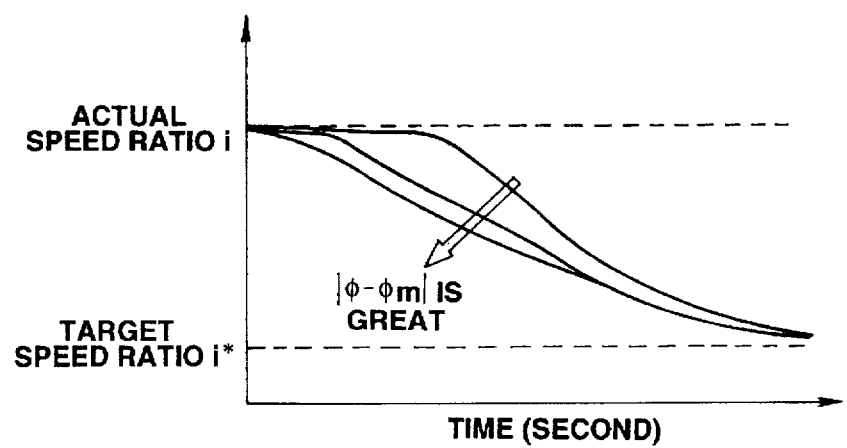
FIG. 15 is a view similar to FIG. 13, illustrating a time chart illustrating a shift operation ensured by the system as shown in FIG. 14.

According to a fifth embodiment as shown in FIG. 14, the deviation $\phi - \phi_m$ is input to a shift map modifying means 61n which serves to correct, when the deviation $\phi - \phi_m$ as input is great, the feedforward step number $S_{FF}$ determined by the target tilting angle operation part 61b and the PI control part 61c so as to make shifting difficult as shown in FIG. 15. Thus, when the deviation $\phi - \phi_m$ or modeling error is great, the speed ratio is slowly changed from the actual one to the target one, preventing vibratile shift control due to the modeling error.

Figure 16:
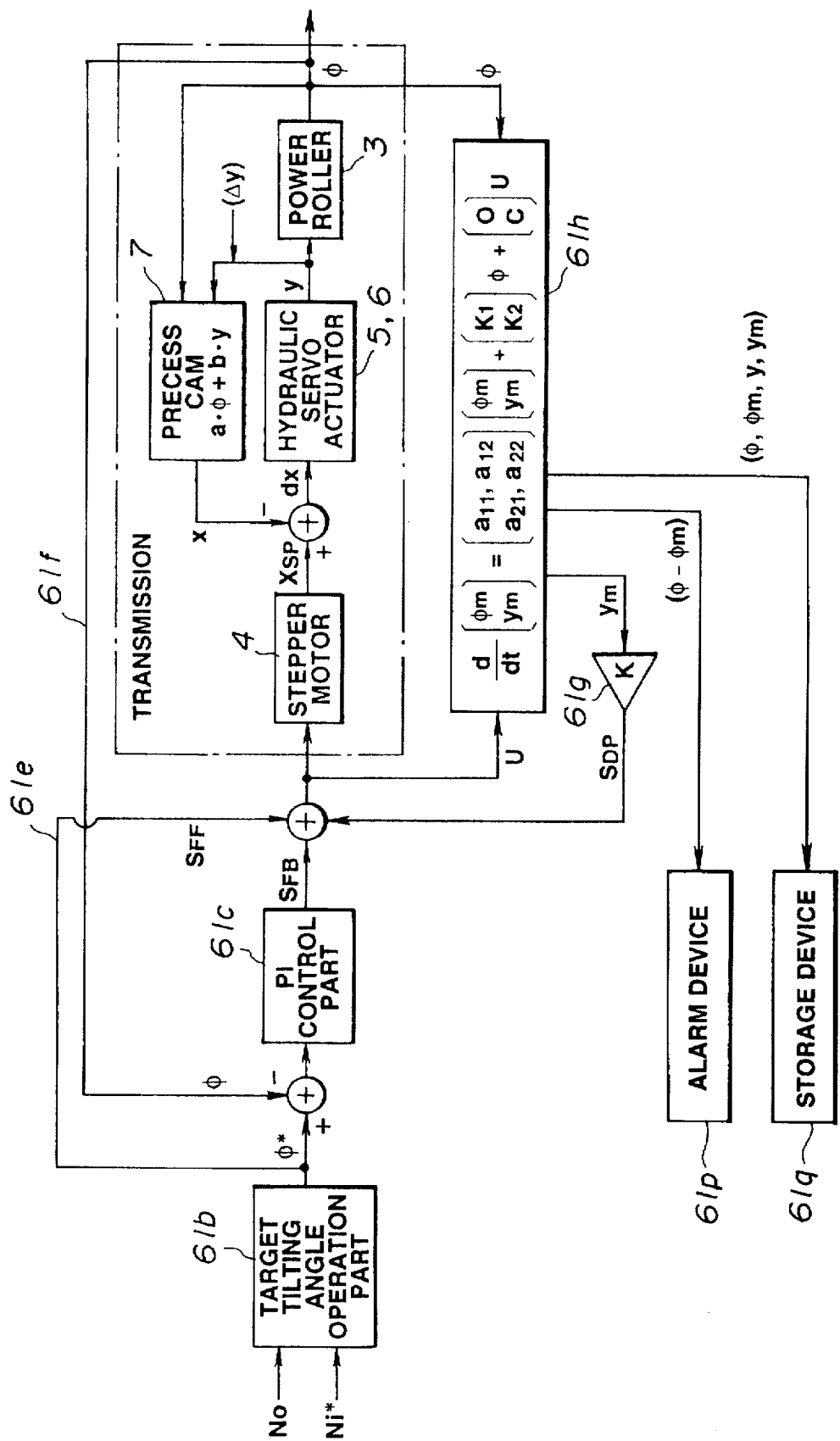
FIG. 16 is a view similar to FIG. 14, showing a sixth preferred embodiment of the present invention.

FIG. 16 shows a sixth embodiment of the present invention. The phenomenon that the observer outputs an incorrect offset amount estimated value $y_m$ can be caused by applying to the troidal continuously variable transmission dynamic interference from the outside, etc. In that case, predetermined measures should be taken immediately. Thus, according to the sixth embodiment, when the observer does not output a predetermined estimated value, a great deviation $\phi-\phi_m$ is provided to an alarm device 61p, and at the same time, calculation results of the observer $\phi$, $\phi_m$, y, and $y_m$ are stored in a storage device 61q for future repair, etc.

Having described the present invention in connection with the preferred embodiments, it is noted that the present invention is not limited thereto, and various changes and modification can be made without departing from the spirit of the present invention.

What is claimed is:

1. A shift control system for a troidal continuously variable transmission provided with input and output discs and power rollers frictionally engaged with the input and output discs for ensuring power transmission therebetween, the shift control system serving to make, in accordance with a shift command value, the power rollers be offset with respect to a position wherein a rotation axis thereof and a rotation axis of the input and output discs cross each other so as to produce tilting of the power rollers about an oscillating axis perpendicular to the rotation axis thereof, the shift control system serving to return the power rollers to the position so as to maintain the shift command value as achieved, the shift control system comprising:

an electronic system arranged to calculate the shift command value;

a first electronic feedback system connected to said electronic system, said first electronic feedback system serving to feed back a first physical quantity indicative of a tilting angle of the power rollers; and a second electronic feedback system connected to said electronic system, said second electronic feedback system serving to feed back a second physical quantity indicative of a speed of change of said tilting angle of the power rollers, said electronic system calculating the shift command value in accordance with said first and second physical quantities.

2. A shift control system as claimed in claim 1, wherein said first electronic feedback system feeds back to said electronic system said tilting angle itself.

3. A shift control system as claimed in claim 1, wherein said first electronic feedback system feeds back to said electronic system a speed ratio determined out of a revolution ratio of the input disc to the output disc.

4. A shift control system as claimed in claim 1, wherein said first electronic feedback system feeds back to said electronic system an input revolution of the transmission.

5. A shift control system as claimed in claim 1, further comprising:

means for estimating an offset amount of the power rollers, said second electronic feedback system feeding back to said electronic system said offset amount estimated by said offset amount estimating means.

6. A shift control system as claimed in claim 1, further comprising:

means for estimating a tilting angular speed of the power rollers, said second electronic feedback system feeding back to said electronic system said tilting angular speed estimated by said tilting angular speed estimating means.

7. A shift control system as claimed in claim 1, further comprising:

means for estimating a speed of change of a speed ratio, with respect to time, determined out of a revolution ratio of the input disc to the output disc, said second electronic feedback system feeding back to said electronic system said speed of change of said speed ratio estimated by said speed estimating means.

8. A shift control system as claimed in claim 1, further comprising:

means for calculating a rate of change of an input revolution of the transmission with respect to time, said second electronic feedback system feeding back to said electronic system said rate of change of said input revolution calculated by said input rate calculating means.

9. A shift control system as claimed in claim 1, further comprising:

means for calculating a rate of change of an output revolution of the transmission with respect to time, said second electronic feedback system feeding back to said electronic system said rate of change of said output revolution calculated by said output rate calculating means.

10. A shift control system as claimed in claim 5, wherein said offset amount estimating means comprises a model which gives a mechanical feedback system in the transmission by a numerical formula, wherein when providing the shift command value to said model, said offset amount of the power rollers produced therein is an estimated value of said offset amount.

11. A shift control system as claimed in claim 10, further comprising:

a modeling error correction system arranged to correct the shift command value so as to eliminate a deviation of said tilting angle from a value indicative thereof produced in said model when providing the shift command value thereto.

12. A shift control system as claimed in claim 10, further comprising:

means for modifying a control gain of the shift command value of said electronic system, said gain modifying means serving to decrease said control gain with an increase in a deviation of said tilting angle from a value indicative thereof produced in said model when providing the shift command value thereto.

13. A shift control system as claimed in claim 10, further comprising:

means for modifying elements of said model, said elements modifying means serving to modify said elements with an increase in a deviation of said tilting angle from a value indicative thereof produced in said model when providing the shift command value thereto so as to prevent vibratile shift control.

14. A shift control system as claimed in claim 10, further comprising:

means for modifying a shift map using in said electronic system, said shift map modifying means serving to modify said shift map with an increase in a deviation of said tilting angle from a value indicative thereof produced in said model when providing the shift command value thereto so as to lag shifting.

15. A shift control system for a troidal continuously variable transmission provided with input and output discs and power rollers frictionally engaged with the input and output discs for ensuring power transmission therebetween, the shift control system serving to make, in accordance with a shift command value, the power rollers be offset with respect to a position wherein a rotation axis thereof and a rotation axis of the input and output discs cross each other so as to produce tilting of the power rollers about an oscillating axis perpendicular to the rotation axis thereof, the shift control system serving to return the power rollers to the position so as to maintain the shift command value as achieved, the shift control system comprising:

means for calculating the shift command value;

means, connected to said calculating means, for electronically feeding back a first physical quantity indicative of a tilting angle of the power rollers; and means, connected to said calculating means, for electronically feeding back a second physical quantity indicative of a speed of change of said tilting angle of the power rollers, said calculating means calculating the shift command value in accordance with said first and second physical quantities.

16. In a troidal continuously variable transmission:

input and output discs;

power rollers frictionally engaged with said input and output discs for ensuring power transmission therebetween; and a shift control system arranged to operate on said power rollers for ensuring shifting, said shift control system serving to make, in accordance with a shift command value, said power rollers be offset with respect to a position wherein a rotation axis thereof and a rotation axis of said input and output discs cross each other so as to produce tilting of said power rollers about an oscillating axis perpendicular to said rotation axis thereof, said shift control system serving to return said power rollers to said position so as to maintain said shift command value as achieved, said shift control system comprising:

an electronic system arranged to calculate said shift command value;

a first electronic feedback system connected to said electronic system, said first electronic feedback system serving to feed back a first physical quantity indicative of a tilting angle of said power rollers; and a second electronic feedback system connected to said electronic system, said second electronic feedback system serving to feed back a second physical quantity indicative of a speed of change of said tilting angle of said power rollers, said electronic system calculating said shift command value in accordance with said first and second physical quantities.

* * * * *